March 25, 1947.   S. S. BARROWS   2,417,902
MAGNIFYING ATTACHMENT FOR MEASURING INSTRUMENTS AND THE LIKE
Filed Feb. 3, 1945   2 Sheets-Sheet 1

INVENTOR.
Stephen S. Barrows,
BY
Chritton, Wiles, Schroeder, Merriam & Hofgren
Attys.

March 25, 1947.　　　S. S. BARROWS　　　2,417,902
MAGNIFYING ATTACHMENT FOR MEASURING INSTRUMENTS AND THE LIKE
Filed Feb. 3, 1945　　　2 Sheets-Sheet 2
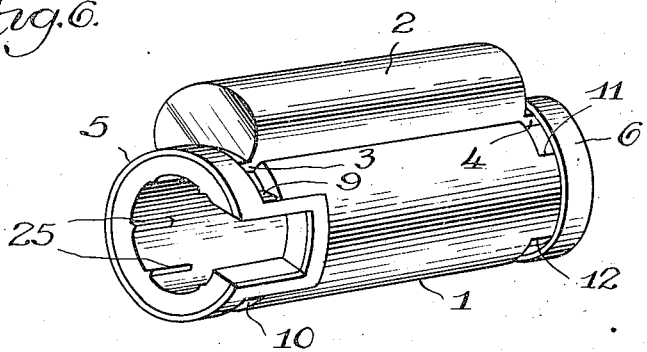
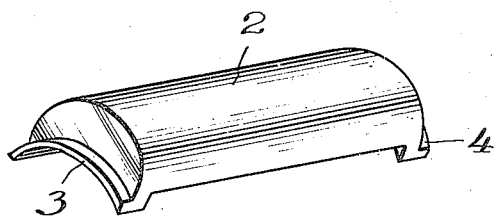
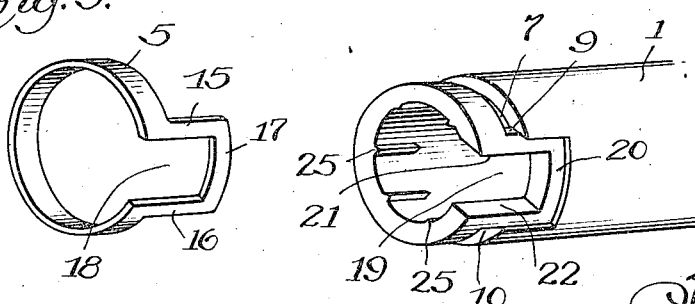
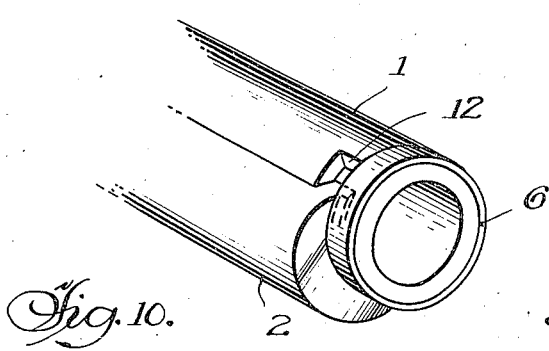
INVENTOR.
Stephen S. Barrows
BY Chritton, Wiles, Schroeder, Merriam & Hofgren
Attys.

Patented Mar. 25, 1947

2,417,902

UNITED STATES PATENT OFFICE 2,417,902

MAGNIFYING ATTACHMENT FOR MEASURING INSTRUMENTS AND THE LIKE

Stephen S. Barrows, Minneapolis, Minn.

Application February 3, 1945, Serial No. 576,061

12 Claims. (Cl. 88—39)

The present invention relates generally to an improved device for increasing the usefulness and capabilities of a magnifying attachment for instruments, and in a more specific sense, although not limited thereto, for measuring instruments having small numerals, lines, letters or other indicia which must be read correctly in order to prevent mistakes occurring in the finished work, as for example in the use of micrometer calipers.

The present invention is an improvement over the magnifying attachment of United States Letters Patent No. 2,349,604, granted to me May 23, 1944, and while shown as applied to a micrometer caliper, I wish it understood that it may be used in connection with other devices to which it may be applicable. Some micrometer calipers are furnished with a ten thousandths scale, referred to hereinafter as the vernier, and which consists of longitudinal lines generally positioned on the back side opposite from that side on which the main reading is taken. It is important in such devices that the fine lines of the vernier be carefully and accurately read as well as the main indicia on the front side.

Customarily the readings on the front side of a micrometer caliper are in thousandths of an inch, it being only possible to guess at a ten thousandth reading from the front. However, in those calipers having a vernier on the back, it is possible to read in ten thousandths of an inch if the operator has good eyes and good light but even then he may make mistakes.

By the present invention such mistakes and errors are eliminated by providing a magnifying lens capable of being selectively moved into either one of two positions to enable accurately reading the thousandths scale on the front when in one position, and the ten thousandths scale or vernier on the back, by simply rotatably sliding the lens to one or the other position. This enables, by ingenious means, a single magnifying lens capable of rotative sliding movement to enable reading by the same lens the indicia on either the front or the back of a micrometer caliper having a vernier on the back.

This enables accurate reading of fine lines, numerals, letters, symbols or other indicia without eyestrain under most adverse lighting conditions.

Among the objects of my invention is to overcome the disadvantages and accomplish the advantages referred to above.

A further object is to provide a novel arrangement of lens in which the light available in a semi-dark place is more readily gathered and diffused over the indicia being read to greatly increase the ease of reading the same.

Another object is to provide means for enabling my magnifying attachment to be readily applied to measuring instruments and the like having variations in size.

A still further object is to provide novel means for slidably mounting the lens on the body portion of the attachment.

Another object of my invention is to provide a magnifying attachment for measuring instruments having a slidably mounted lens so formed as to be capable of magnification and which may be made of certain kinds of plastics, glass, or other suitable transparent material adapted to the requirements of this attachment.

Other objects, advantages and capabilities, inherently possessed by my invention, will later more fully appear.

My invention further resides in the combination, construction and arrangement of parts illustrated in the accompanying drawings, and while I have shown therein a preferred embodiment I wish it understood that the same is susceptible of modification and change without departing from the spirit of my invention.

In the drawings:

Fig. 6 is an enlarged perspective view of my magnifying attachment looking toward the end having the positioning slot.

Fig. 7 is an enlarged perspective view of the movable lens.

Fig. 8 is an enlarged fragmentary perspective view of the positioning slot end of the lens supporting cylinder but without the lens and adjacent confining ring.

Fig. 9 is an enlarged perspective view of one of the confining rings and in the position it would occupy just prior to being pushed into place on the adjacent end of the cylinder of Fig. 8.

Fig. 10 is an enlarged fragmentary perspective view of my magnifying attachment looking toward the rear end which is the end away from that end having the positioning slot.

Figure 1:
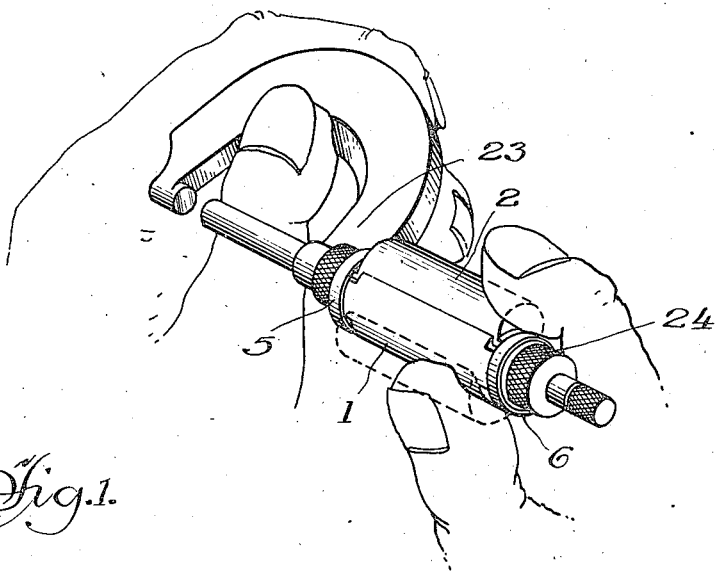
Fig. 1 is a perspective view of a micrometer caliper having my magnifying attachment applied thereto.
Figure 5:
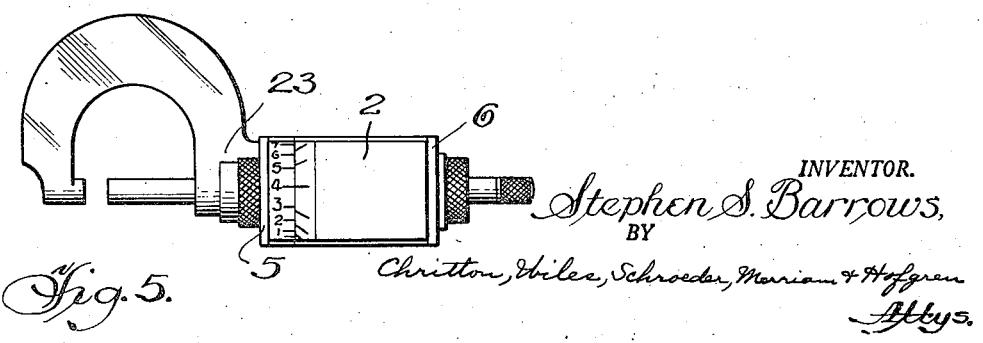
Fig. 5 is a side elevation of a micrometer caliper having my magnifying attachment applied thereto but looking toward the rear side and showing the magnification of the vernier portion of the caliper.

Referring in detail to the drawings my novel magnifying attachment comprises in general the cylinder 1 upon which is slidably mounted the lens 2 formed at its forward end with an arcuate flange 3 and at its rear end with a similar arcuate flange 4, which flanges slidably seat underneath the inner edges of the confining rings 5 and 6 respectively. As seen in Figs. 1 and 5 I have shown for illustrative purposes only my invention as applied to that type of micrometer caliper having on the front face the usual readings on a thousandths scale as shown more clearly in my said Patent 2,349,604, and on its rear face with indicia for reading in ten thousandths of an inch which latter scale is referred to as a vernier. I wish it understood however, that my invention is also applicable to other instances to which it may be applicable in reading fine lines where a slidably mounted lens is desired.

Figures 2, 3, 4:
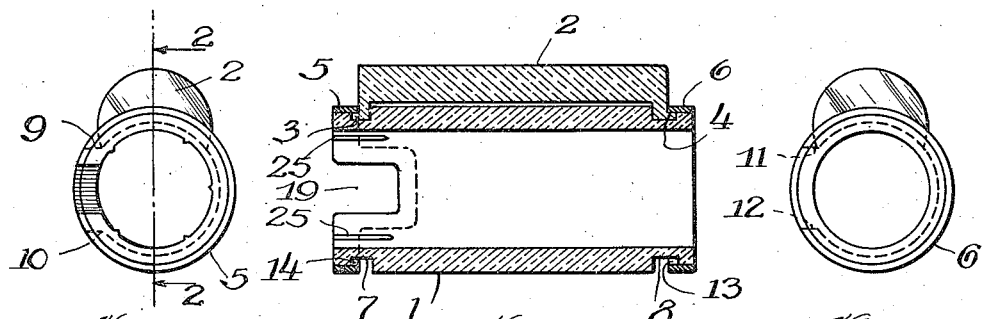
Fig. 2 is an enlarged vertical longitudinal section of my magnifying attachment detached from the caliper.
Fig. 3 is an end view of the attachment looking toward the left hand end of Fig. 2.
Fig. 4 is a similar view but looking toward the right hand end of Fig. 2.

As noted in Figs. 2, 3, 4 and 6, the cylinder 1 is formed adjacent each of its ends with circumferential grooves 7 and 8 in the front and rear end portions respectively, which grooves do not extend entirely around the circumference but as seen in Fig. 8 the groove 7 terminates at the stops 9 and 10 (also see Fig. 3) while the rear groove 8 terminates at the stops 11 and 12 (also see Fig. 4). Extending around the rear end of cylinder 1, is a flat ring 6 preferably with a sufficiently tight fit to normally be retained thereon but which if sufficient force is applied thereto may be removed from the cylinder in order to apply a new lens if desired. The inner edge of ring 6 extends inwardly to overlie a portion of groove 8 to form an arcuate groove 13 to slidably receive flange 4 (see Fig. 2), which flange may rotate in a circular path in the groove 13 until one or the other of the adjacent edges of the lens strikes one or the other of the stops 11 and 12.

The front edge of cylinder 1 has also fitted thereover a ring 5 which overlies a slight distance the groove 7 to provide an annular groove 14 to similarly receive the front flange 3 to be slidable therein until one or the other of the adjacent sides of the lens strikes one or the other of the stops 9 and 10. Ring 5 is similar to ring 6 except that it has two rearwardly extending portions 15, 16 connected together at their rear end by the member 17 to define a longitudinal extending closed slot 18 which, when the ring 5 is applied to the cylinder 1, will register with the slot 19 in the cylinder. The diameter of the front end of cylinder 1, which receives ring 5, is sufficiently smaller than that of the cylinder so that when ring 5 is applied thereto its exterior diameter will be the same as the exterior diameter of cylinder 1 before the lens is applied thereto. This results in the portion 20 of the cylinder around slot 19 being a groove of a depth equal to the thickness of the metal of ring 5 so that when the portions 15, 16 and 17 of this ring are positioned in the depression 20 the outer faces of these portions will be flush with the outer face of the cylinder 1 as will be understood in Figs. 6, 8 and 9. The side walls 21 and 22 of slot 19, together with the inner edge of the portions 15 and 16 will be in registry and adapted to be nicely seated over the adjacent portion of the caliper frame 23 when the cylinder 1 is pushed home to its final position over the sleeve of the calipers in a manner that will also be clearly understood in my said Patent No. 2,349,604.

The cylinder and lens of my magnifying attachment will be made of a transparent material such as plastics, glass or other suitable transparent material capable of magnification, particularly the lens portion. If desired, the lens may be of magnifying material and the cylinder of nonmagnifying material, or if desired both the cylinder and lens may be of such magnifiable material. Among the plastics which I have successfully used is acrylic resin which is obtained by certain treatment of acrylic acid, and in the form used in my invention is a thermoplastic solid which can be molded, machined, is transparent, is practically unbreakable, and when properly shaped has magnifying characteristics. Acrylic resins of the type referred to herein, are available as molding powders, cast sheets, rods, bars, tubes and the like. Another usable plastic material is polystyrene, but I wish it understood that any other suitable plastic or other transparent material capable of being formed to have magnification may be used without departing from the spirit of my invention. As stated, glass, when properly formed can also be used.

On the inner surface of the bore of cylinder 1, extending a short distance inwardly from the front end are formed a plurality of narrow ribs 25 adapted to be snugly mounted around the adjacent surface of the frame 23. The purpose of these ribs is that when the attachment is to be applied to a micrometer caliper in which the adjacent portion of the frame is slightly larger than expected, the thin inner edge of these V-shaped ribs can be partially removed to the desired extent by filing, grinding, shaving or in any other manner to remove a desired amount of the inner edge of the rib so that the cylinder will have a degree of variation in effective diameter. In other words, by means of these ribs 25 the cylinder may, within certain limits, be placed over the adjacent portion of frames of varying diameters.

The lines forming the vernier on the rear face of the micrometer caliper are shown in Fig. 5 with the lens 2 applied thereover. The manner of using such vernier is well understood and need not be described in detail except to state that the coinciding lines indicate the measurement in ten thousandths of an inch as is well understood in such vernier. The micrometer caliper with the lens in the same position as in Fig. 5 is shown in a slightly different position of the caliper for easy reading in Fig. 1 with the fingers of the operator in position to subsequently slide the lens around to the other face of the caliper when desired for reading measurements in thousandths of an inch. In other words, my magnifying attachment makes it possible to slide the lens from one position to another on the cylinder to enable use of the lens for magnifying indicia on different localities such as on the vernier on one face, and the main indicia on another face.

I have found that with a lens formed of acrylic resin the lens when placed even in a semi-dark location will collect the rays of light and diffuse them over the indicia being read in a manner much more efficient for easy reading than an ordinary transparent material.

Having described my invention, I claim:

1. A magnifying attachment for measuring instruments having measurement indicating indicia thereon, comprising a transparent body portion adapted to be secured stationarily in position upon the measuring instrument, and a magnifying lens mounted for movement in an arcuate path on said body portion and selectively movable to be placed over any one of a plurality of positions to magnify measurement indicating indicia thereunder, said body portion being tubular in construction and the inner face of the lens having an arcuate transverse curvature corresponding to the curvature of the outer surface of the tubular body portion.

2. A magnifying attachment for measuring instruments having measurement indicating indicia thereon, comprising a transparent tubular body portion adapted to be secured stationarily in position upon the measuring instrument, and a magnifying lens mounted for movement in an arcuate path on said body portion and selectively movable to be placed over any one of a plurality of positions to magnify measurement indicating indicia thereunder, a flange on each end of the lens, and a confining member extending over a portion of each of said flanges to slidably receive the same.

3. A magnifying attachment for measuring instruments having measurement indicating indicia thereon, comprising a transparent body portion adapted to be secured stationarily in position upon the measuring instrument, and a magnifying lens mounted for movement in an arcuate path on said body portion and selectively movable to be placed over any one of a plurality of positions to magnify measurement indicating indicia thereunder, said body portion being tubular in construction and the inner face of the lens having an arcuate transverse curvature corresponding to the curvature of the outer surface of the tubular body portion, an arcuate flange on each end of the lens, and a pair of spaced confining rings, each of said rings extending over at least a portion of one of the flanges to slidably receive and retain the same.

4. A magnifying attachment for measuring instruments having measurement indicating indicia on a plurality of sides that are normally somewhat difficult to read, comprising a transparent tubular body portion having a longitudinal opening therethrough adapted to receive a portion of the measuring instrument therein and a magnifying lens slidably movable in an arcuate path to different positions on the body portion to selectively magnify said indicia on said plurality of sides of the measuring instrument, an arcuate flange on each end of the lens, and a confining member on the body portion for each flange for slidably holding the lens on the body portion, said lens having a surface corresponding to the curvature of the outer surface of the tubular body portion.

5. A magnifying attachment for measuring instruments having measurement indicating indicia on a plurality of sides that are normally somewhat difficult to read, comprising a transparent tubular body portion having a longitudinal opening therethrough adapted to receive a portion of the measuring instrument therein and a magnifying lens slidably movable in an arcuate path to different positions on the body portion to selectively magnify said indicia on said plurality of sides of the measuring instrument, an arcuate flange on each end of the lens, and a confining member on the body portion for each flange for slidably holding the lens on the body portion, and arcuate grooves in the tubular body portion in which said flanges are slidably mounted, the confining members being extended partially over the grooves with the flanges underneath the same, said lens having a surface corresponding to the curvature of the outer surface of the tubular body portion.

6. A magnifying attachment for measuring instruments having measurement indicating indicia on a plurality of sides that are normally somewhat difficult to read, comprising a transparent tubular body portion adapted to be coaxially positioned over a portion of the measuring instrument, a magnifying lens mounted on the body portion for movement in an arcuate path, the body portion having means cooperating with the lens to slidably hold the lens on the body portion to enable the lens to be selectively moved to different positions on the body portion to read indicia on different sides thereof, said lens having an arcuate surface corresponding to the curvature of the outer surface of the tubular body portion.

7. A magnifying attachment for measuring instruments having measurement indicating indicia, comprising a transparent hollow body portion adapted to be coaxially positioned over a portion of the measuring instrument, a magnifying lens mounted on the body portion for movement in an arcuate path, and thin projections on the inside of the body portion adapted to have portions removed to fit over said portion of the measuring instrument to fit measuring instruments of different sizes.

8. A magnifying attachment for measuring instruments having measurement indicating indicia, comprising a transparent tubular body portion adapted to be coaxially positioned over a portion of the measuring instrument, a magnifying lens mounted on the body portion for movement in an arcuate path, and thin projections on the inside of the body portion adapted to have portions removed to fit over said portion of the measuring instrument to fit measuring instruments of different sizes, said projections being in the form of thin elongated ribs.

9. A magnifying attachment for measuring instruments having measurement indicating indicia, comprising a transparent tubular body portion adapted to be coaxially positioned over a portion of the measuring instrument, a magnifying lens mounted on the body portion for movement in an arcuate path, and thin projections on the inside of the body portion adapted to have portions removed to fit over said portion of the measuring instrument to fit measuring instruments of different sizes, said projections being in the form of thin elongated ribs, said magnifying lens being slidably mounted on the tubular body portion.

10. A magnifying attachment for measuring instruments having measurement indicating indicia thereon, comprising a transparent tubular body portion adapted to be secured in coaxial position upon the measuring instrument, and a magnifying lens movably mounted on said body portion for movement in an arcuate path and selectively movable to be placed over any one of a plurality of positions to magnify measurement indicating indicia thereunder, said body portion having a groove with closed ends forming stops, the lens having stops so that when moved to the limit of its movement in either direction a lens stop will contact with a groove stop to selectively position the lens in any one of a plurality of predetermined positions with relation to the body portion.

11. A magnifying attachment for measuring instruments having measurement indicating indicia thereon that are normally somewhat difficult to read, comprising a transparent tubular body portion adapted to be coaxially positioned over a portion of the measuring instrument which has a laterally extending member, a magnifying lens mounted on the body portion for movement in an arcuate path, the body portion having a longitudinally extending notch in one end adapted to be seated over the laterally extending member, a ring extending around one end portion of the body portion, said ring having a rearwardly extending portion whose inner side edges register with the side edges of the notch.

12. A magnifying attachment for measuring instruments having measurement indicating indicia thereon that are normally somewhat difficult to read, comprising a transparent tubular body portion adapted to be coaxially positioned over a portion of the measuring instrument which has a laterally extending member, a magnifying lens mounted on the body portion for movement in an arcuate path, the body portion having a longitudinally extending notch in one end adapted to be seated over the laterally extending member, a ring extending around one end portion of the body portion, said ring having a rearwardly extending portion whose inner side edges register with the side edges of the notch, means for slidably mounting the lens on the body portion, and means for limiting the amount of sliding movement of the lens, said lens being made of a plastic having magnifying characteristics.

STEPHEN S. BARROWS.

REFERENCES CITED

The following references are of record in the file of this patent:

UNITED STATES PATENTS

| Number | Name | Date |
|---|---|---|
| 996,039 | Keuffel | June 20, 1911 |
| 1,367,879 | Laird | Feb. 8, 1921 |
| 1,463,624 | Mabee | July 31, 1923 |
| 1,667,449 | Wompner | Apr. 24, 1928 |
| 2,211,559 | Erickson | Aug. 13, 1940 |
| 2,349,604 | Barrows | May 23, 1944 |